Oct. 23, 1962 J. F. BAKER ET AL 3,060,277

MAGNETIC HEAD SUSPENSION

Filed Jan. 23, 1957 2 Sheets-Sheet 1

INVENTORS
JOHN F. BAKER
DUSAN S. GELLETICH
WILLIAM J. WASYLENKO
BY H. Walter [signature]
AGENT Oct. 23, 1962

J. F. BAKER ET AL 3,060,277

MAGNETIC HEAD SUSPENSION

Filed Jan. 23, 1957

2 Sheets-Sheet 2

INVENTORS
JOHN F. BAKER
DUSAN S. GELLETICH
WILLIAM J. WASYLENKO

BY [signature]

AGENT

United States Patent Office 3,060,277

Patented Oct. 23, 1962

3,060,277

MAGNETIC HEAD SUSPENSION

John F. Baker, Dusan S. Gelletich, and William J. Wasylenko, Philadelphia, Pa., assignors to Burroughs Corporation, Detroit, Mich., a corporation of Michigan Filed Jan. 23, 1957, Ser. No. 635,724
11 Claims. (Cl. 179—100.2)

The present invention relates to electromagnetic transducers and more particularly to transducers of the type which operate in conjunction with a magnetic storage medium to record and read data in computing and like apparatus.

The type of transducer with which the invention is particularly concerned comprises a plurality of magnetic heads each including a magnetic circuit with which one or more windings are linked, and having a relatively narrow air gap for positioning in close proximity to a storage medium for recording and reading operations. These heads are arranged in a linear row to produce parallel magnetic tracks upon a drum recording medium, or in concentric circles when used in conjunction with a rotating disk recording medium. In conventional practice the width dimensions of the respective heads is such that but a single track can be produced by each head so that the overall efficiency of the complete assembly is limited to the number of heads.

With still further particularity the invention is concerned with the type of transducer assembly wherein the head structure is positioned over a rotating record disk to float upon a thin film of air generated by the rotation of the disk. Such an assembly is described and claimed in the pending application of Otto Hohnecker, entitled "Magnetic Head Suspension," Serial No. 587,990, filed May 29, 1956, now Patent No. 2,950,354, and assigned to the assignee of the present invention.

An object of the present invention is to provide an improved magnetic head structure of the above described type which is operable to increase the number of record tracks over which it can operate without increasing the number of assembled heads.

Another object is to provide a magnetic head assembly of the aforesaid floating type which is shiftable relative to record tracks.

Still another object is to provide an assembly of magnetic heads, wherein each head is selectively arranged to record or read adjacently positioned tracks.

A further object is to provide a magnetic head assembly including a plurality of magnetic heads arranged in aligned relation and spaced to initially record or read a plurality of equally spaced tracks with respect to a rotatable record medium, and shiftable to vary the linear position of the heads to record or read a second plurality of tracks on the same medium while floating on a thin film of air generated by the rotating recording medium.

Figure 1:
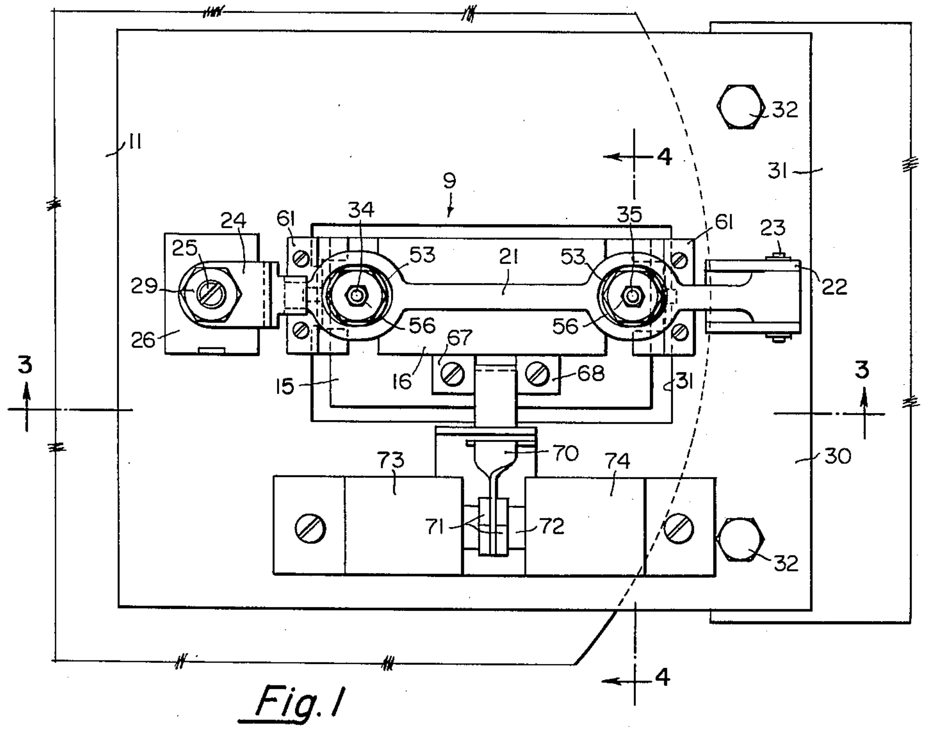
FIG. 1 is a plan view of apparatus incorporating the concepts of the invention.
Figure 2:
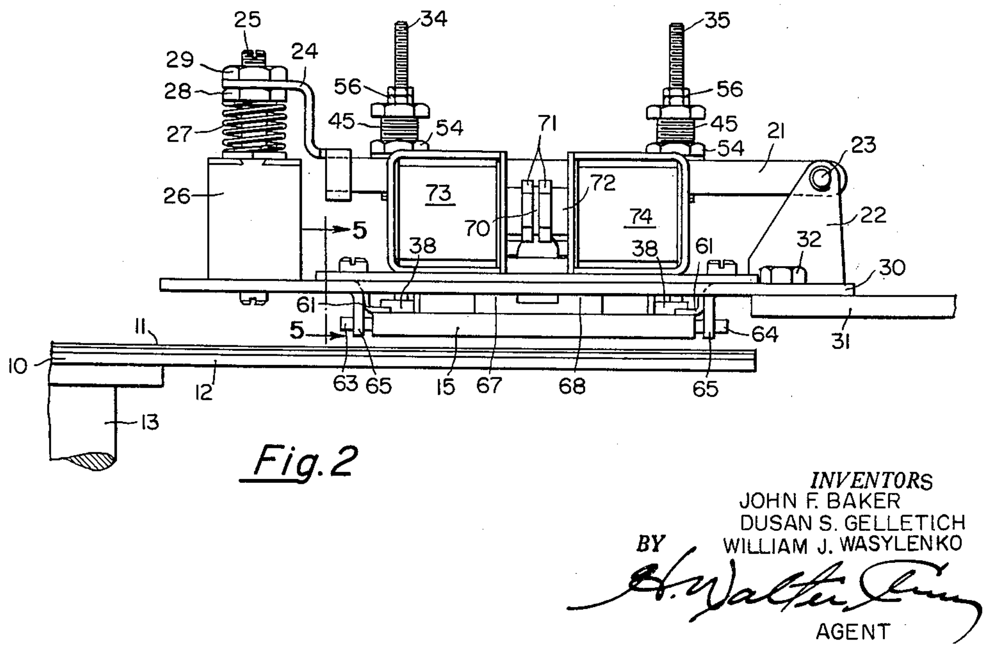
FIG. 2 is a side elevational view of the apparatus of FIG. 1.

Referring to the drawings, and particularly to FIGS. 1 and 2, illustrating a preferred form of the invention, the numeral 9 designates a magnetic head assembly mounted above a circular disk 10 of a non-magnetic material having on its face a magnetizable material 11, such as powdered iron oxide dispersed in a solidified vehicle. The disk 10 is arranged to be removably attached to the face of a turntable 12 which is keyed or otherwise secured to a shaft 13 for rotation about its axis, as by a motor, not shown. Alternatively the magnetizable material 11 may be directly applied to the face of the turntable, and in the following description the term "disk" is intended to include both structures.

For recording and/or reproducing, the head assembly comprises a base 15 of non-magnetic material having an upstanding member 16 housing a selected number of aligned magnetic heads 17 (FIG. 3) embedded in plastic and having working surfaces flush with the planar bottom of base 15 to form a row along a radius of disk 10 when mounted for operation in juxtaposed relation to the top surface of the disk. The heads 17 are each of conventional design and conveniently may be as shown in detail in the aforementioned Hohnecker application, and in FIG. 6 of the present case, wherein electrically conductive windings or coils 18 are wrapped around high permeability magnetic elements 19 having an air gap 20, a few thousandths of an inch in width. Normally the average spacing or clearance between the heads and the disk surface is of the order of ½ mil during operation. The heads 17 are preferably uniformly spaced in order to record a plurality of concentric tracks upon the magnetizable material 11 of disk 10. However, the track spacing is limited by the thickness of the head at the windings which in some heads is approximately ⅜ of an inch. Of course the magnetic elements are thinner, and therefore the spacing between this portion of adjacent heads is such that with fixed head assemblies, circular areas of the disk capable of additional tracks normally are wasted, that is, where only one head is used. The present invention overcomes this condition by providing means to shift the head assembly in a manner to produce at least twice as many tracks than heretofore possible with this type of magnetic head structure and without destroying its air floating characteristics, now to be described.

A lever 21 provides means for supporting the head assembly for flexible or floating operation in response to contour deviations of disk surface 11 as transmitted aerodynamically by an intervening stream of fluid, such as air, developed by the rotation of disk 10, as fully described in the aforesaid Hohnecker application. Lever 21 is pivoted at one end between the legs of a V-shaped bracket 22 on a horizontal pivot pin 23, and extends medially across but spaced from housing 16 to terminate in an apertured end 24 through which passes the threaded end of plunger 25 of a solenoid 26. A compression spring 27 encircles plunger 25 and is predeterminedly compressed between solenoid 26, and a nut 28 threaded on plunger 25. A lock nut 29 is also threaded on plunger 25 to clamp the end 24 of lever 21 in place to move with the plunger when solenoid 26 is energized. Bracket 22 for pivotally supporting lever 21, is attached to the upper face of a plate 30 having an aperture 31 through which the head assembly extends in spaced relation therewith and in this embodiment aperture 31 and the head assembly are rectangular in shape. Plate 30 may be supported above the turntable in any convenient manner, as by fixed structure 31 (FIGS. 1 and 2) to which the plate is secured by screws 32.

Figure 4:
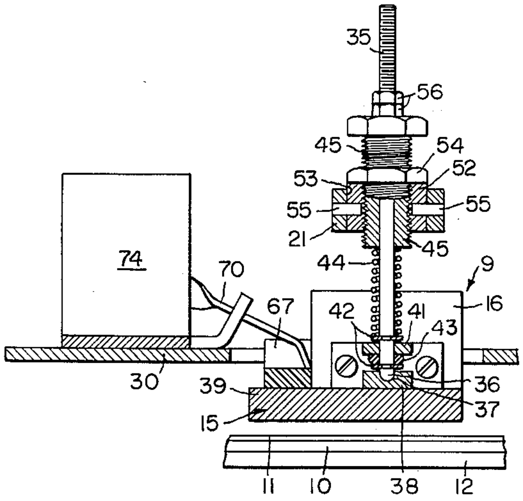
FIG. 4 is a sectional view taken along line 4—4 of FIG. 1.

The floating mounting of the head assembly also includes two spring loaded spindles 34 and 35 having their rounded lower ends 36, as seen in FIG. 4, seated in bearing sockets 37 provided in bosses 38 fixed to the upper face of the air-foil portion or shoe 39 of base 15 at opposite ends of housing 16. The spindles pass through apertured lugs 41 which project from each end of housing 16, after which a pair of collars 42 in the form of C-rings are fixed to the spindles, one on each side of the lug, by snapping them into grooves (not shown) formed in the spindles for this purpose.

The spacing of the collars on each spindle is the same and such as to provide for limited movement of the lugs relative to the spindles. In view of the pivotal mounting of lever 21, however, it has proved more advantageous to take up this space on spindle 35 by means of a rubber grommet 48, thereby better maintaining the under surface of base 15 substantially parallel with the top surface of disk 10 during movement to and from its operating position. The upper collars provide abutments for coil springs 44 which encircle the spindles and are compressed between the abutments and sleeves 45 through which the spindles pass. Sleeves 45 are supported by and project through lever 21 as later described. While in the foregoing description lugs 41 and bosses 38 have been described as separate elements connected to the housing and to base 15, they may, as shown in this embodiment of the invention, be formed by U-shaped brackets fixed to the head.

Figure 3:
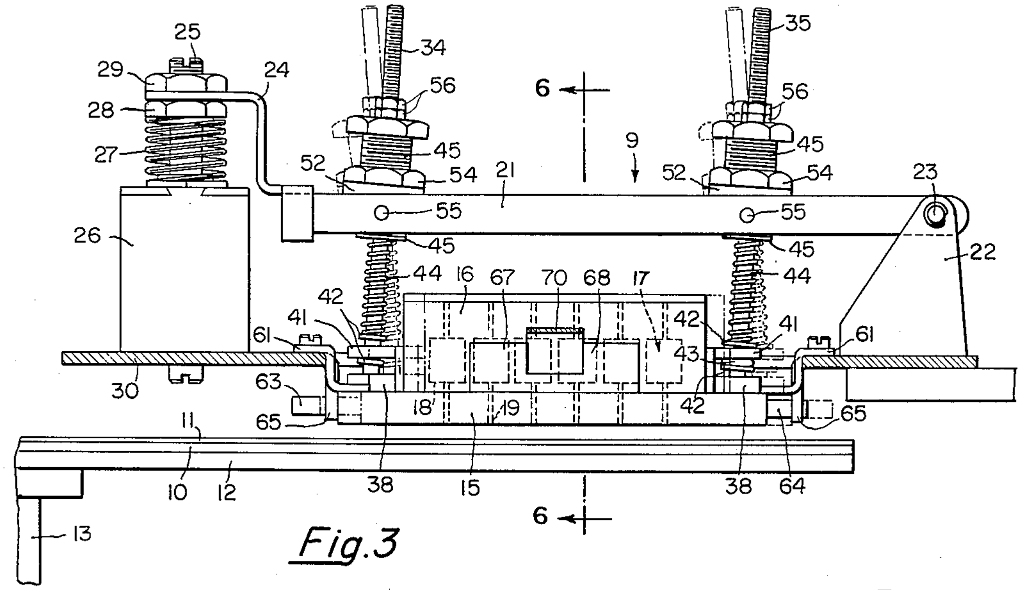
FIG. 3 is a sectional view taken along line 3—3 of FIG. 1.

As shown more clearly in FIGS. 3 and 4, to provide the desired endwise shifting movement of head assembly 9 for selecting a track recording or reproducing position, each of the sleeves 45 is threaded through a bushing 52 located in a hole 53 (FIG. 1) in an enlarged portion of lever 21 and carries an adjusting nut 54. Bushing 52 is mounted on two diametrically aligned pivot pins 55 journalled in opposite sides of lever 21 to permit bushing 52 with its attached housing supporting elements to rock about the horizontal axis formed by pivots 55. In this connection it should be noted that while the diameter of bushing 52 is the same as the transverse dimension of lever hole 53, the latter is elongated in the direction of the length of lever 21 thus to provide clearance for limited pivotal movement of bushings 52. The protruding ends of spindles 34 and 35 are threaded to receive adjusting and lock nuts 56 providing means for lifting the head assembly from its extended operative position upon upward movement of lever 21 by spring 27 when solenoid 26 is deenergized.

Figure 5:
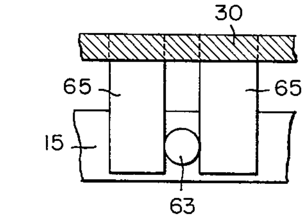
FIG. 5 is a fragmentary view of a portion of the apparatus taken along line 5—5 of FIG. 2.

Since the head assembly, as so far described, is suspended in a manner permitting endwise movement, means are provided for guiding such movement to prevent displacement of the head in a transverse direction while still permitting movement thereof in response to irregularities of the disk surface, as described above. This means comprises a pair of lugs 61 secured to plate 32 at each end of aperture 33 (FIGS. 1 and 3). Each pair of lugs straddles its adjacent spindle bearing 38 and lies in a plane contacting the top surface of head base 15 when the latter is in retracted inoperative position, as seen in FIG. 2. Guide pins 63 and 64 project respectively from opposite ends of base 15 substantially in the medial plane of the magnetic heads, and are arranged to move freely axially and vertically between two lugs 65 downwardly turned from plate 32 (FIG. 5), thus preventing side to side movement of the head assembly.

In order to shift the head assembly to select one of two track positions, base 15 is provided with a pair of spaced apart pusher blocks 67 and 68 (FIG. 3) which straddle the extended end of a shift arm 70, the opposite end of which, as seen in FIG. 2, is clamped between nuts 71 threaded on an intermediate portion of core plunger 71 of two aligned solenoids 73 and 74. By selectively pulsing the solenoids, head assembly 9 is shifted between radially spaced terminal positions, as shown by full and broken lines in FIG. 3. Illustratively, and as here described, a shift of 3⁄16 of an inch will be sufficient to position the heads to record a second series of tracks. As a result of bidirectional shifting two tracks may be recorded 3⁄16 of an inch apart in the same space as heretofore formed by fixed heads with 3⁄8 of an inch between tracks.

In other words, head assemblies now in use, with heads of 3⁄8 of an inch width, make possible the recording or reading of tracks on the magnetic medium, but the width of the track spacing is limited to the width of the respective heads, which in the case of 3⁄8 inch head spacing means a track spacing of 3⁄8 of an inch. The present invention provides an improved air floated head assembly making it possible to use heads of 3⁄8 inch head spacing to obtain track spacing of 3⁄16 of an inch and thereby double the number of tracks. Thus for an assembly of six aligned heads the same selecting circuits can be used for both positions of the heads thereby making it possible to record or reproduce twelve tracks where heretofore but six could be produced, that is unless a second head assembly was provided and arranged with its heads to record between the tracks of the first, and such second assembly would therefore require separate track selecting circuits. Of course, with heads of other spacing these figures will vary.

While in the foregoing it was believed advantageous to describe the supporting means for the head assembly in some detail the means for controlling raising and lowering of the assembly has been omitted because it forms no part of the present invention. In its operation however, as fully described in the above mentioned Hohnecker application to which reference can be had if thought necessary, when solenoid 26 is energized, lever 21 is rotated in a counterclockwise direction to lower the head to recording position above rotating disk surface 11, where it is supported by a thin film of air generated by the rotating disk. In this extended position and whether in either of the radial terminal positions, as described above, the head assembly is freely responsive to irregularities in the disk surface to rock and roll about the ends 36 of spindles 34 and 35, and by flexing of springs 44. The radial terminal position may be selected when the head assembly is in its retracted or its extended position relative to the disk surface.

Figure 6:
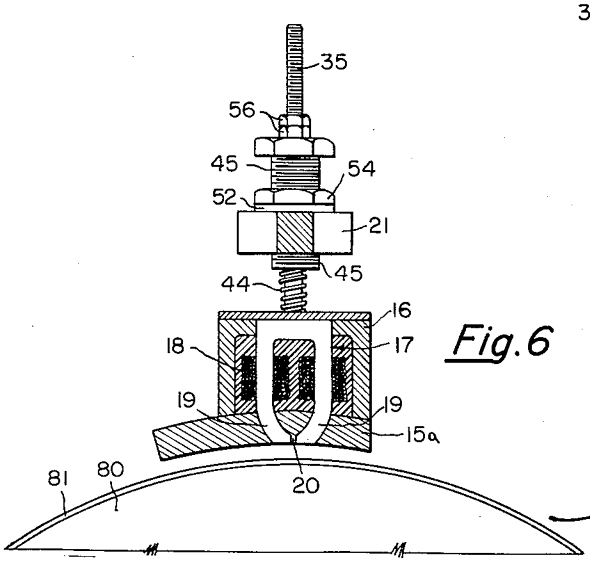
FIG. 6 is a view similar to FIG.4 but showing a modified form of the invention.

In the modified form of the invention shown in FIG. 6 the head assembly is the same as described above, except that the base of the head designated here by the numeral **15*a*, has been rounded in accordance with the surface contour of a drum 80 having a magnetizable surface 81**.

What is claimed is:

1. In magnetic transducer apparatus, the combination of a rotatable disk having a magnetizable surface on one face thereof, a fixed support assembly, a movable magnetic head carried by said assembly, said head having a face positioned in juxtaposed relation to said surface and normally held in inoperative position spaced from said surface, means for rotating said disk to induce an air cushion between said face and said surface to support said head when in operative position closely adjacent said surface, means carried by said assembly for moving said head to its operative position on said air cushion corresponding substantially to the contour of said surface and relative to concentric tracks of said magnetizable disk surface, and electrically controlled means for radially shifting the position of said head relative to the surface of said rotating disk from one concentric track to another.

2. In magnetic transducer apparatus, the combination of a rotatable disk having a magnetizable surface on one face thereof, a support structure, a plurality of magnetic heads aligned along a radius of said disk and having a face positioned in juxtaposed relation to said surface, means mounting said heads on said support structure for movement between inoperative and operative positions spaced from and close to said surface respectively, means for rotating said disk to induce an air cushion between said face and said surface to support said head, means preventing said head structure from following the rotation of said disk yet permitting rocking, tilting and bodily movement thereof in response to deforming of said air cushion by variation of the contour of said disk, and electromechanical means for radially shifting said head structure whereby said magnetic heads are positioned over different concentric surface portions of said disk.

3. In a magnetic transducer apparatus, the combination of a rotatable disk having magnetizable material on one surface, a magnetic assembly including a plurality of magnetic heads arranged along a radius of said disk and having a substantially planar surface facing said disk surface, means for shifting said magnetic assembly along said radius, means for rotating said disk to induce a stream of air between said surfaces to form a cushion therebetween, means biasing said head against said cushion yet permitting relative freedom of movement of said heads, and means coacting with said assembly to prevent movement of said head in the direction of disc rotation yet permitting said head to rock respectively about two axes in response to deforming of said cushion by variations of the surface contour of said disc, movement of said head about one of said axes being response to radial variations of said surface and about the other in response to variations substantially coincident with the direction of said airstream, said shifting of said magnetic assembly being in the order of half the distance between each of said magnetic heads therein.

4. A construction in accordance with claim 3 and further including means for mounting said head structure for slidable movement along said radius, and solenoid means for shifting said heads, said last means comprising a core plunger and an arm connecting said plunger to said head structure.

5. A construction in accordance with claim 3 and further including means for mounting said head structure for slidable movement along said radius, and wherein said shifting means comprises a pair of axially aligned solenoids having a common core plunger and an arm connecting said plunger to said head structure in a manner whereby movement thereof by energization of said solenoids is effective to move said head structure along a radial path between terminal positions.

6. In a magnetic transducer apparatus, the combination of a rotatable member having magnetizable material on one surface thereof, a magnetic assembly including a plurality of closely spaced magnetic heads arranged in a line across a surface of said rotatable member and having a substantially planar surface facing the magnetizable material on the surface of said member, electro magnetic means for shifting said magnetic assembly across the surface of said member from one predetermined position to another, means for rotating said member to induce a stream of air between said surfaces to form an air cushion therebetween, means biasing said head against said cushion yet permitting relative freedom of movement of said heads, and means coacting with said assembly to prevent movement of said head in the direction of rotation of said member yet permitting said head to rock and roll in response to deforming of said air cushion by deviations in the surface contour of said member, said shifting of said magnetic assembly being of an extent less than the spacing between said magnetic heads therein.

7. In magnetic transducer apparatus, the combination of a rotatable member having a magnetic memory surface, a unit including a plurality of magnetic heads linearly arranged in spaced relation in a common surface, means supporting said unit with said common surface juxtaposed to said memory surface for recording or reading a first set of memory tracks by the respective heads, support means including flexible means permitting said unit to float on an air cushion induced between said common surface and said rotatable member as a result of the rotation of said member, and electrically operated means for moving said head linearly to a second set of memory tracks spaced respectively from the first set of tracks.

8. Apparatus according to claim 7 wherein said electrically operated means includes two opposed selectively operated solenoids having a common core, and an actuating arm connected at one end to said core and at its other end to said head units.

9. In magnetic transducer apparatus, the combination of a rotatable member having a magnetic memory surface, a unit including a plurality of magnetic heads, means supporting said unit for endwise movement in juxtaposed relation to said member, means operatively connected to said supporting means to permit said unit to float in response to aerodynamic pressure induced between said unit and said surface as a result of the rotation of said member, and electro mechanical means to shift said unit between terminal radial positions when in said floating condition to position said heads to record or read a plurality of memory tracks on said surface while in either position.

10. Apparatus according to claim 9, wherein said electro mechanical shifting means comprises a pair of axially aligned solenoids selectively operable.

11. A magnetic transducer apparatus comprising, a rotatable member having magnetizable material on one surface thereof, a magnetic assembly including a relatively movable magnetic head having a substantially planar surface facing the magnetizable material on the surface of said member, means for rotating said member to induce a stream of air between said surfaces to form an air cushion therebetween, means on said assembly normally supporting said head in an inoperative position away from said member and operable to bias said head to an operative position against said air cushion yet permit relative freedom of movement of said head, means coacting with said assembly to prevent movement of said head in the direction of rotation of said member yet permitting said head to rock and roll in response to deforming of said air cushion by deviations in the surface contour of said member, and means for shifting said head across the surface of said member from one predetermined position to another relative to said magnetizable material.

References Cited in the file of this patent

UNITED STATES PATENTS

| | | |
|---|---|---|
| 2,038,216 | Harrison | Apr. 21, 1936 |
| 2,144,844 | Hickman | Jan. 24, 1939 |
| 2,530,584 | Pontius | Nov. 21, 1950 |
| 2,532,803 | Faus | Dec. 5, 1950 |
| 2,590,091 | Devol | Mar. 25, 1952 |
| 2,644,856 | Pettus | July 7, 1953 |
| 2,668,059 | Roberts | Feb. 2, 1954 |
| 2,737,646 | Muffly | Mar. 6, 1956 |
| 2,750,579 | Lekas et al. | June 12, 1956 |
| 2,751,439 | Burton | June 19, 1956 |
| 2,769,037 | Dank et al. | Oct. 30, 1956 |
| 2,772,135 | Hollabaugh et al. | Nov. 27, 1956 |
| 2,950,354 | Hohnecker | Aug. 23, 1960 |

Disclaimer 3,060,277.—*John F. Baker*, *Dusan S. Gelletich*, and *William J. Wasylenko*, Philadelphia, Pa. MAGNETIC HEAD SUSPENSION. Patent dated Oct. 23, 1962. Disclaimer filed May 28, 1964, by the inventors and assignee, *Burroughs Corporation.*

Hereby enter this disclaimer to claim 1 of said patent.

[*Official Gazette August 25, 1964.*]